United States Patent [19]

Mötting et al.

[11] 4,067,528

[45] Jan. 10, 1978

[54] MOUNTING DEVICE FOR A FLAT STRUCTURAL PART PROJECTING FROM A VEHICLE BODY

[75] Inventors: Götz Mötting; Wilhelm Bauer, both of Sindelfingen; Werner Kleisser, Ostelsheim, all of Germany

[73] Assignee: Daimler-Benz Aktiengesellschaft, Germany

[21] Appl. No.: 686,688

[22] Filed: May 17, 1976

[30] Foreign Application Priority Data

May 17, 1975 Germany ............................ 2522121

[51] Int. Cl.² .......................................... B60R 27/00
[52] U.S. Cl. .................................... 248/204; 280/762
[58] Field of Search ........................... 248/204, 475 B; 403/111, 123; 52/113; 404/11

[56] References Cited

U.S. PATENT DOCUMENTS

| 930,071 | 8/1909 | Greenlaw | 403/123 X |
|---|---|---|---|
| 1,526,742 | 2/1925 | Chapel | 404/11 |
| 1,599,986 | 9/1926 | Chapel | 404/11 |
| 2,095,016 | 10/1937 | Waterbor | 404/11 |
| 2,978,217 | 4/1961 | Gunderson | 248/204 |
| 3,188,913 | 6/1965 | O'Shei | 248/475 B |
| 3,588,016 | 6/1971 | Reinhard | 248/204 |
| 3,813,113 | 5/1974 | Burnham | 248/475 B |

FOREIGN PATENT DOCUMENTS

| 581,388 | 8/1959 | Canada | 248/475 B |
|---|---|---|---|
| 576,609 | 10/1958 | Italy | 280/762 |
| 1,133,297 | 11/1968 | United Kingdom | 248/204 |
| 1,442,519 | 7/1976 | United Kingdom | 280/762 |

*Primary Examiner*—J. Franklin Foss
*Attorney, Agent, or Firm*—Craig & Antonelli

[57] ABSTRACT

A mounting support for a flat structural part projecting from the outer body of a motor vehicle, such as a firm emblem, a radiator figure, or the like, which is connected with the body by way of a first pivotal connection and a second pivotal connection, whereby the first pivotal connection is provided with a bearing socket open in the direction toward the structural part and with a joint member pivotal about three different axes intersecting at least approximately in a common point forming the pivot center; the second pivotal connection providing only a single degree of freedom of movement connects between the joint member with the structural part whereby the pivot axis of this second pivotal connection is arranged essentially transversely to the driving direction and at least approximately parallel to the outer body panel.

69 Claims, 13 Drawing Figures

FIG 6
FIG 7
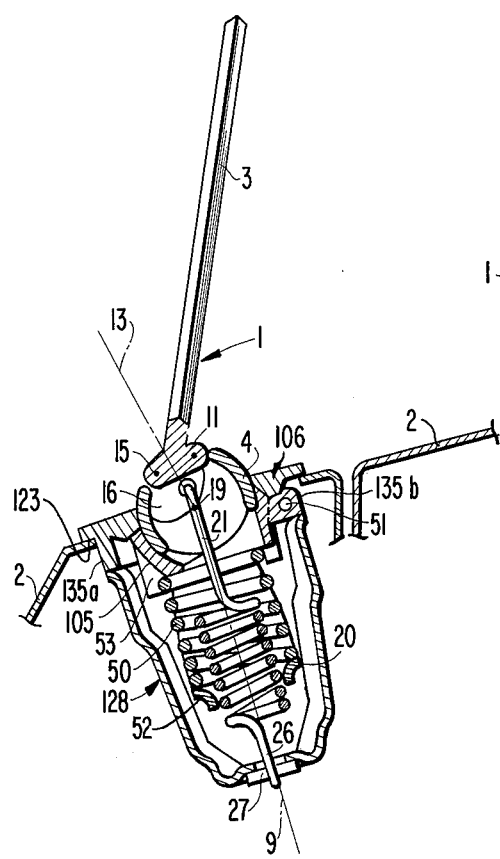
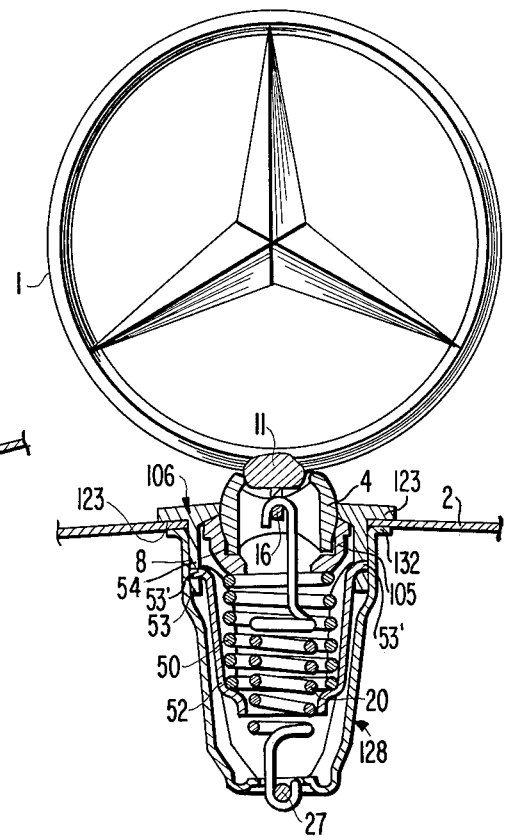
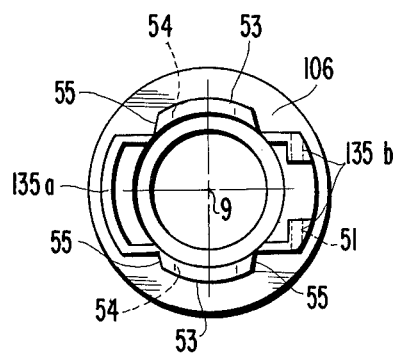
FIG 8

MOUNTING DEVICE FOR A FLAT STRUCTURAL PART PROJECTING FROM A VEHICLE BODY

The present invention relates to a mounting support for a flat structural part projecting from the outer body covering of a motor vehicle body, especially for a firm emblem of the vehicle manufacturer, a radiator attachment figure or the like, with a preferably at least approximately spherically shaped bearing socket open in the direction toward the structural part as well as with a joint member, especially a joint ball, stressed and clamped into the bearing socket by a spring force and at least limitedly pivotal in the bearing socket about three different pivot axes intersecting at least approximately in a common point (pivot center), which is preferably stabilized in a normal position by means of detent projections or the like.

Such a mounting support is disclosed, for example, in the German Pat. No. 1,630,406 see also U.S. Pat. No. 3,588,016. It is disadvantageous with this type of mounting support that the more recent safety regulations as regards such projecting structural parts cannot be fulfilled with the same. These regulations specify that projecting structural parts must abut flat against the body in all directions under the influence of a predetermined force and more particularly in such a manner that the remaining projecting length amounts maximum to 10 mm.

It is proposed according to the present invention for the purpose of fulfilling this safety requirement that the pivot center of the—triple—joint connection formed by the bearing socket and the joint member lies at least approximately in the course or plane of the outer body panel, that half the diameter of the kinematically effective surface of the joint member corresponds at most to approximately the thickness of the structural part and that a further —single—pivotal connection permitting exclusively a single degree of freedom of the movement is provided between the joint member and the structural part whereby the pivot axis of this pivotal connection is arranged transversely to the driving direction and at least approximately parallel to the outer body panel as a result of this structural arrangement, large pivot angles of the structural parts are possible in compliance with the legal safety regulations.

Owing to the two-link joint chain in the mounting support of the structural part, a universal tiltability up to the complete flat position essentially parallel to the corresponding part of the body is assured in which the aforementioned legal requirements are fulfilled. By reason of the exclusively single dimensional pivotability of the joint place arranged nearest the structural part, the normal position can also be always unequivocally established which is predetermined by the detent nose portions or projections adapted to be overcome by pressure and provided at the three-dimensionally pivotal joint. In order to enable a particularly flat abutment of the retained flat structural part which for the most part extends at least approximately along one plane, it is appropriate if the pivot center of the triple joint connection is arranged offset preferably toward the rear, as viewed in the driving direction, with respect to the plane of extension of the retained structural part. The further single pivotal connection between the triple joint connection and the retained structural part can be constructed as elastically clamped together socket joint whereby a simplification from a constructive and manufacturing point of view is achieved as compared to other types of joints and further functional possibilities are opened thereby. Thus, for example, the joint may be equipped with a return moment urging or forcing the structural part into the normal position, for example, in that the socket joint is elastically stressed and clamped together and in that correspondingly constructed, flat places are provided at mutually corresponding places of the joint socket and of the joint member. In order that the single joint is able to dip or immerse partly into the socket of the triple joint connection when the retained structural part is displaced into an extreme tilted-down position, and in order that the extreme flat position can thus be assumed unobstructedly, provision is made according to the present invention that the joint member of the single pivotal connection is kept with its outer contour opposite the joint socket at least approximately inside of the kinematically effective surface of the triple joint connection as imaginary envelope.

The strong tilting over or buckling of the two-link joint chain both toward the rear as also toward the front is more readily realizable from a constructive point of view if the imaginary line characterizing the normal position of the single pivot connection (joint perpendicular) is arranged inclined, and more particularly inclined forwardly in the driving direction, to the plane of extension of the retained structural part. Similarly, provision may also be made—with the same goal—that the joint normal of the single pivotal connection is also arranged inclined, and more particularly also inclined forwardly in the driving direction, with respect to the corresponding joint normal of the triple pivotal connection determined in its position by detent projections adapted to be overcome by pressure. The joint chain is then constructed curved polygon-like in the elastically stressed and clamped together, normal position and more particularly forwardly in the driving direction. More specifically, with a freely supported firm emblem the free angular space between the emblem and body outer panel, disposed to the rear of the emblem in the driving direction, is normally smaller than the corresponding angular space disposed in front of the emblem so that the tilting angle up to the flat position is smaller toward the rear than toward the front. The smaller rear tilting angle can therefore be overcome with a favorable construction alone by the triple joint connection whereas the forward larger tilting angle requires both joints to be overcome without obstruction, which for that reason are pre-oriented in the forward direction. For securing an exclusively one-dimensional movability of the single joint or for the unequivocal blocking of a movability of the single joint also about another direction, a cross web extending perpendicularly to the pivot axis may be arranged at the joint member of the single joint and a corresponding cross slot may be provided in the joint socket thereof, and a spring, especially a coil drawspring, which effects the elastic and elastic clamping together of the joint stressing may engage at the cross web. The aforementioned cross web therefore serves not only as anti-rotational safety means for the single joint about the joint normal but simultaneously also as abutment means for a spring especially for a coil spring, which brings about the elastic clamping together of the joint. It is of help for a constructive and manufacturing simplification if the spring elastically stressing and clamping together the single joint connection and the spring elastically stressing and clamping together the triple joint connection are one and the same spring and if the joint member of the tripe joint connection is constructed hollow and the point of pivotal connection of the spring is arranged on the inside of the hollow joint member. The uniform, single spring which stresses and clamps together the joint, thus stresses and clamps together the entire two-link joint chain, whereby the tensioning spring itself may be arranged outside the relatively small joint members and can therefore be dimensioned freely corresponding to requirements.

For purposes of avoiding dirt-collecting corners, it is appropriate if the joint socket and the joint member of the single joint connection are constructed round or spherical—apart from and as viewed one the flattened portion—and if the transition from the flattened portion into the remaining socket surface is rounded off in cross section whereby the centers of the rounded off parts at two diametrally opposite places are to be considered as instantaneous pivot axes of the single joint connection.

The already mentioned cross web at the single joint connection, on the one hand, should be constructed as large as possible in order that it produces a stable pivotal connecting eyelet for the tension spring and, on the other, is able to secure in a stable manner the cross position of the structural part. On the other hand, the cross web should, of course, correspond to the small space conditions and should not impair a functioning of the joint. In order to satisfy both requirements, provision is appropriately made that at least one flank of the cross web, and more particularly the rear flank of the cross web as viewed in the driving direction, is constructed as lying with its contour line inside of the or approximately on a circular arc which is as large as possible and is slidable through the associated cross slot, with the center thereof in the instantaneous pivot axis of the single joint connection.

Since the emblems mounted for the most part centrally on the engine hood which is inclined forwardly in the driving direction are inclined for styling reasons opposite the driving direction, i.e, toward the rear, the angle between the emblem and the vehicle outer body panel which is located to the rear of the emblem in the driving direction is for the most part considerably smaller than the opposite angle, i.e., the corresponding angle located in front of the emblem in the driving direction. The mounting support can therefore be so constructed that the pivot movement required for a tilting-down toward the rear can be permitted alone by the triple joint connection whereas the pivot path required for a tilting-down toward the front is made available by the utilization of the pivot range of both joints. In order to now enable a disengagement or pressure release of the detent nose portions or projections determining the normal position of the emblem with the rearwardly directed smaller tilting-down required in the majority of cases, without the possibility that the single pivotal connection responds in that case and might possibly be overstretched, it is appropriate if one flank of the cross web, and more particularly preferably the forward flank of the cross web, as viewed in the driving direction, is constructed with its contour—starting from the normal position of the single joint connection—at least approximately following the inner contour of the cavity of the joint member of the triple joint connection. As a result thereof, the single joint connection is blocked in the movement direction of the smaller required pivot range, i.e., toward the rear.

In order to impart to the structural part also a certain yieldingness in case of an impact impinging nearly perpendicularly to the outer body panel and to initiate a lateral bending or buckling of the structural part, it is appropriate if the joint socket of the triple joint connection is yieldingly supported perpendicularly to the extension of the body outer panel, yet is pivotally connected preferably hinge-like at a relatively fixed body part fixed secured against rotation and is assisted with a compression coil spring.

Appropriately the mounting support of the structural part is inserted as separate pre-assembled aggregate into the outer body panel and is secured thereat. In order to constitute the fastening as simple as possible from a constructive and manufacturing point of view and in order to require as few individual parts as possible, it is appropriate if a collar is provided which is inserted into an opening of the outer body panel, covers the opening externally by means of a support flange and carries at least indirectly the joint socket of the triple joint connection, and if a hold-down member is provided which is supported within the area of the support flange of the collar against the inside of the outer body panel, and if the spring stressing and clamping together the triple joint connection is constructed as tension spring and is suspended with its hook opposite the joint connection at a point of the hold-down member. As a result of the fastening of the tension spring at the hold-down member, the tension spring is utilized for two different purposes, namely, on the one hand, for stressing and clamping together the joint or joints and on the other, for producing the fastening or retaining force of the structural part mounting support at the body. As a result of this combination of functions, a number of otherwise required individual parts is dispensed with, and the mounting support becomes correspondingly more simple and less costly.

For facilitating the assembly of the fastening means of the preassembled mounting support at the body, provision may be made that the insert opening for the collar in the body outer panel as well as the extension at the collar, which extends through the insert opening and is correspondingly shaped, are constructed non-round, that the hold-down member is constructed and arranged rotatable with respect to the collar and is supported exclusively at individual circumferential places or areas of the opening edge by reason of a material recess, and that circumferential places (spacer places) are provided at the extension of the collar with such a diametric or radial dimension of the extension which are equal to or larger than the corresponding distances or the radial position of the support places of the hold-down member and that other circumferential places (detent places) are provided in the circumferential direction at the extension adjacent to the spacer places with such a diametric or radialdimension of the extension which are smaller than the corresponding distances or the radial position of the support places of the hold-down member. The fastening of the mounting support at the body then takes place by insertion of the preassembled mounting support into the provided insert aperture and by rotation of the hold-down member on the inside of the body; as a result of the rotation, the hold-down member slides off the spacer places of the collar and engages at the detent places or at the inside of the body panel present thereat and clamps the collar down from the inside claw-like.

In order to assure a secure relative position of the individual parts of the mounting support in the pre-assembled position and in order to keep as small as possible the axial movement of the hold-down member during engagement into the clamping position, provision is made according to the present invention that the axial dimension of the extension of the collar extending beyond the effective surface of the support flange is constructed approximately equally large within the area of the spacer places and at least approximately corresponding to the material thickness of the outer body panel plus the thickness of any existing washer. In order that the hold-down member has a radial guidance during the rotation thereof, the axial dimension of the extension of the collar is appropriately larger within the area of the detent places than within the area of the spacer places.

Since the hold-down member is constructed at least with its support foot portions in the shape of a circular arc in cross section for reasons of the rotation during the assembly and also for manufacturing reasons, provision is made for purposes of achieving a good radial guidance of the hold-down member during the rotation thereof and for purposes of achieving a contour of the extension at the collar which corresponds as much as possible to the contour of the hold-down member in its support area, that the individual circumferential areas of the extension of the collar are constructed in the shape of a circular arc with the center of the radius of curvature lying approximately in the center point of the collar. In order to facilitate the hold-down member or its support foot portions to slide up on the guide portions during the rotation of the hold-down member, the circumferential areas of the detent places which project axially with respect to the spacer places of the extension of the collar are provided with radially outwardly pointing, bevelled-off or inclined portions at the circumferential transition places.

Firm emblems and radiator figures are endangered by theft as learned from experience—particularly if they are movably retained according to the safety regulations. In order to offer a certain resistance to a forcible removal of the structural part, provision is made in the mounting support of the structural part according to the present invention that the joint socket of the triple joint connection is provided with an opening for the passage of a coil spring elastically stressing and clamping together the joint connection and in that the opening is arranged eccentrically to the coil spring. As a result of the eccentric arrangement of the opening, an abutment is created for the winding part of the coil spring so that the tension spring can be stretched exclusively up to the abutment of the first spring winding at the eccentric opening. With a favorable construction of the spring, however, the joint member of the triple joint connection is held still nearly concentrically in the ball socket with such a spring tensioning so that the winding part of the coil spring cannot be brought into the eccentric position of the opening. The hook or lug of the coil spring which is barely accessible from the outside in this position is made of a very strong spring steel and could be cut—if at all—only with special tools. In order to prevent a wanton removal of the entire mounting support of the structural part, provision is made that the hold-down member in the installed position is form-lockingly locked together at least indirectly with the collar, preferably by a bayonet-like locking mechanism. A lifting of the collar under stretching of the tension spring retained on one side by the hold-down member is not possible as a result of this locking action.

Accordingly, it is an object of the present invention to provide a mounting support for a flat structural part projecting from the outer body of a motor vehicle which avoids by simple means the aforementioned shortcomings and drawbacks encountered in the prior art.

Another object of the present invention resides in a mounting support for a flat structural part projecting from a vehicle body which is simple from a constructive point of view and brings about substantial simplification in manufacture and assembly.

A further object of the present invention resides in a mounting support for a flat structural part projecting from the body of a motor vehicle which is able to be tilted in all directions to the extent required to be in full compliance with present-day safety regulations.

A further object of the present invention resides in a mounting support for a flat structural part projecting from the body of a motor vehicle which utilizes two pivotal connections series-connected to bridge the unequal angular paths which must be traversed during the tilting movement of the structural part normally mounted at non-right angle to the body.

Still a further object of the present invention resides in a mounting support for a structural part of the type described above which is not only simple in construction but effectively minimizes the areas and corners where dirt can collect and which enables a pre-assembly of the mounting support prior to its installation in the body.

Another object of the present invention resides in a mounting support for a flat structural part projecting from the body of a motor vehicle which permits an extraordinarily simple fastening and installation of the mounting support.

Still another object of the present invention resides in a mounting support for flat structural parts projecting from the body of motor vehicles which minimizes the number of parts required by assigning multiple functions to certain parts thereof.

A still further object of the present invention resides in a mounting support of the type described above which not only permits pre-assembly thereof prior to installation at the body but also assures a secure relative position of the individual parts of the mounting support in the pre-assembled condition.

A further object of the present invention resides in a mounting support for a flat structural part projecting from the body of a motor vehicle, especially for a radiator emblem, which provides certain anti-theft features to prevent wanton removal thereof.

These and other objects, features and advantages of the present invention will become more apparent from the following description when taken in connection with the accompanying drawing which shows, for purposes of illustration only, two embodiments in accordance with the present invention, and wherein:

FIG. 6 is a longitudinal cross-sectional view through a modified embodiment of a mounting support in accordance with the present invention, which provides an additional yieldingness of the firm emblem;

FIG. 7 is a transverse cross-sectional view through the mounting support of FIG. 6;

FIG. 8 is a bottom plan view on an individual part of the mounting support according to FIGS. 6 and 7 illustrating the collar without the ball socket;

Figure 10:
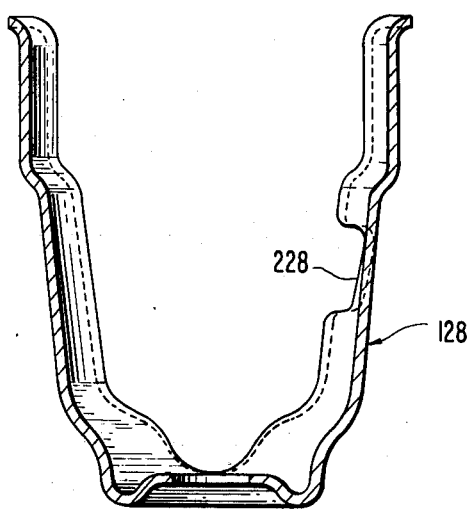
Figure 12:
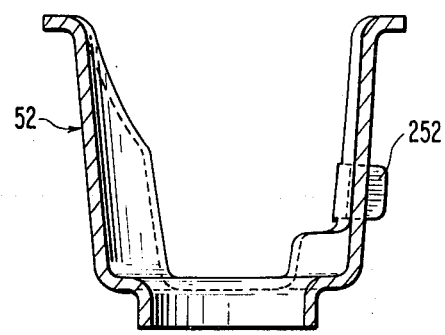
Figure 11:
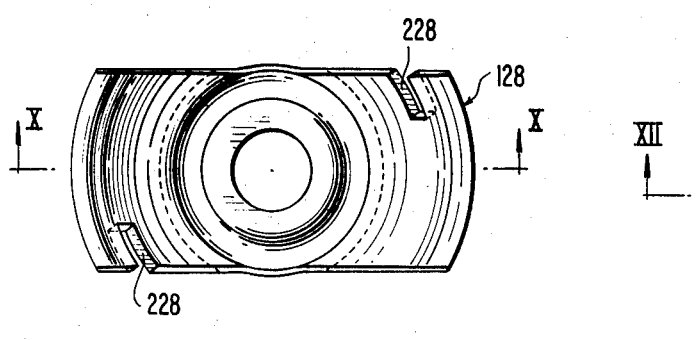
Figure 13:
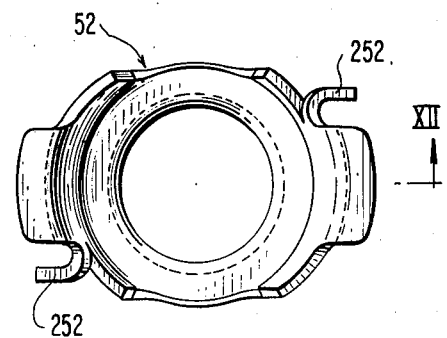

FIGS. 10 and 11 are respectively a cross sectional and a plan view of a modified hold-down member for use in the embodiment of FIGS. 6 - 8; and FIGS. 12 and 13 are respectively a cross sectional and a plan view of a modified retaining bracket for cooperation with the hold-down member of FIGS. 10 and 11.

Referring now to the drawing wherein like reference numerals are used throughout the various views to designate like parts, and more particularly to FIGS. 1 through 5, the flat firm emblem 1 with the plane of extension 3 thereof is to be movably, yet freely projectingly retained at the vehicle outer body panel 2 of the motor vehicle by means of the mounting support of the invention illustrated in these figures. The mounting support according to the present invention provides for that purpose a two-link joint chain with elastically stressed and clamped together ball and socket joints having each a predetermined normal position. The details of the mounting support are to be explained at first by reference to the exploded view of FIG. 1 and their mutual cooperation by reference to the assembly views of FIGS. 2 and 3.

The main joint of the mounting support which is pivotal about three mutually perpendicular axes and thus forms a triple joint connection consists of the hollow joint ball 4 as joint member and of the hollow, spherically shaped, shell-like joint socket 5 which in the embodiment according to FIGS. 1 to 5 is made in one piece with the collar 6 of the mounting support that includes a support flange 23. The center point 19 (FIG. 1) of the ball socket 5 is so selected in relation to the support flange 23 of the collar 6 that the center point representing the pivot center of the triple joint connection comes to lie approximately in the course of the outer body panel 2 at the fastening place. The socket 5 and the ball 4 are provided outside of the equitorial plane of the ball surface with two oppositely disposed nose-like projections 7 and corresponding recesses 8, respectively. As a result thereof, a normal position of the joint ball 4 in the socket 5 is form-lockingly determined which is adapted to be overcome by pressure. The joint normal of the triple joint connection coincides with the center line 9 of the mounting support indicated in dash and dot lines, which is at least approximately perpendicular to the surface of the outer body panel 2; however, the joint normal is inclined forwardly in the driving direction with respect to the gravitional force direction represented by the perpendicular to the driving direction indicated by the arrow 14—by reason of an inclination of the outer body panel 2 at the fastening place in the forward direction.

At the place of the ball 4 facing the firm emblem 1, a joint socket 10 for a further joint—the single joint connection—is provided. The joint member 11 belonging to this joint socket 10—the joint pearl or bead—is constructed in one piece with the firm emblem 1 and is arranged at the lowest place thereof. The socket 10 and the bead-like joint member 11 include each a corresponding flattened off portion emphasized by the dash and dot line 12 (FIG. 1) whose direction determines the normal position of the single joint and thus the joint normal 13 indicated in dash and dotted lines. The joint normal 13 of the single pivotal connection is inclined forwardly, as viewed in the driving direction indicated by arrow 14 (FIGS. 1 and 2), by the angle $\alpha$ with respect to the joint normal 9 of the triple joint connection.

Figure 1:
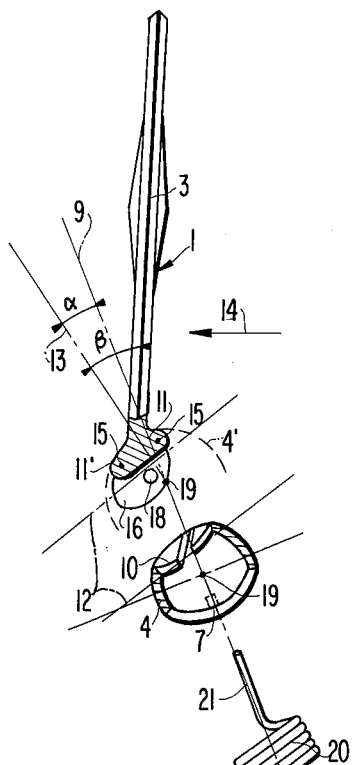
FIG. 1 is an exploded view of an emblem mounting support in accordance with the present invention and illustrating the individual parts thereof.
Figure 1A:
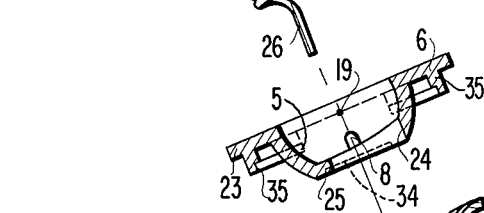
FIG. 1a is a plan view on the socket portion of the single pivotal connection formed by the joint member of the triple joint connection.
Figure 1A:
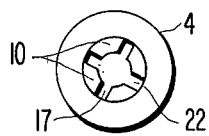

The joint normal 13 is also inclined forwardly by the angle $\beta$ with respect to the plane 3 of the firm emblem 1. The joint member 11 and the flattened portion 12 thereof are constructed round—as viewed in the direction of the joint normal 13—which is also the case for the corresponding joint socket 10 at the ball 4. The transitions from the flattened portion 12 into the joint member 11 as also the corresponding places at the joint socket 10 are constructed with a predetermined rounded-off configuration having center points 15 for the radii of curvature thereof. These center points 15 represent the kinematically effective pivot centers of the single pivotal connection. The outer contour 11' (FIG. 1) of the joint member 11, opposite the joint socket 10, is shaped corresponding to the contour 4' of the ball 4 indicated in dash lines or is held at least approximately inside this contour so that the joint member 11 is able to immerse into the socket 5 of the ball. A web 16 is arranged at the bottom side of the joint member 11, which extends in the driving direction 14, i.e., transversely to the plane 3 of the firm emblem 1. For purposes of the passage of this web 16 through the joint socket 10, the joint socket 10 is provided with a slot 17 (FIG. 1a). The web 16 serves several purposes: On the one hand, it serves for the suspension of a spring stressing and clamping together the joint structure, a suspension opening 18 being provided for that purpose in the web 16, and, on the other, it serves an anti-rotation means of the single joint connection about the joint normal 13 in order that the detent means $\frac{7}{8}$ of the triple joint connection determining the normal position of the firm emblem remain effective also by way of the interconnected single joint 10/11, and additionally it serves a joint blocking means for the single joint connection in the pivot direction toward the rear which will be described more fully hereinafter. For that purpose, the forward contour of the cross web 16, as viewed in the driving direction, is constructed corresponding to the inner contour of the ball 4, i.e., concentric to the circular arc 4'. As a result thereof, a relative pivot movement of the joint member 11 in the socket 10 toward the rear is prevented. Such a movement can be dispensed with because the smaller rear angular space can be overcome alone by the triple joint connection 4/5. However, in order that the single joint connection 4/5 is able to move in the forward direction, the rear contour of the cross web 16, as viewed in the driving direction, is curved in the shape of a circular arc with the center point in the forward pivot center 15.

Figure 2:
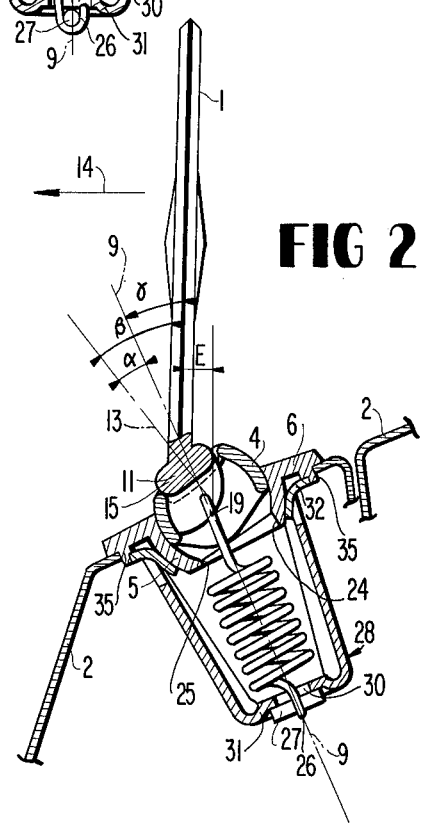
FIG. 2 is a longitudinal cross-sectional view in the vehicle longitudinal direction through an assembled mounting support in accordance with the present invention and illustrating the parts of FIG. 1 during the assembly into the vehicle body.

As a result of the described mutual inclination of the joint normals 9, 13 and of the plane 3, also an inclination of the plane 3 of the firm emblem 1 to the joint normal 9 of the triple joint connection 4/5 comes into existence, as indicated by the angle δ (FIG. 2), and more particularly toward the rear as viewed in the driving direction. As a result of this inclination δ the center point 19 of the triple ball joint 4/5 which is the pivot center thereof is displaced toward the rear out of the plane 3 of the firm emblem 1 by the distance E (FIG. 2). This eccentricity enables a flat abutment of the firm emblem 1 toward the rear at the body exclusively by reason of the triple ball joint 4/5 without requiring a response of the single joint connection 10/11.

Figure 3:
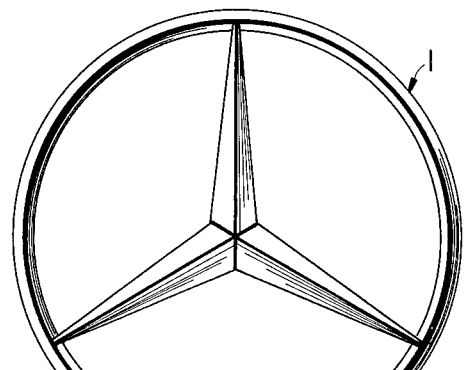
FIG. 3 is a transverse cross-sectional view in the direction transversely to the driving direction of the vehicle and illustrating the various parts of the mounting support in accordance with the present invention in the fully assembled position.
Figure 9:
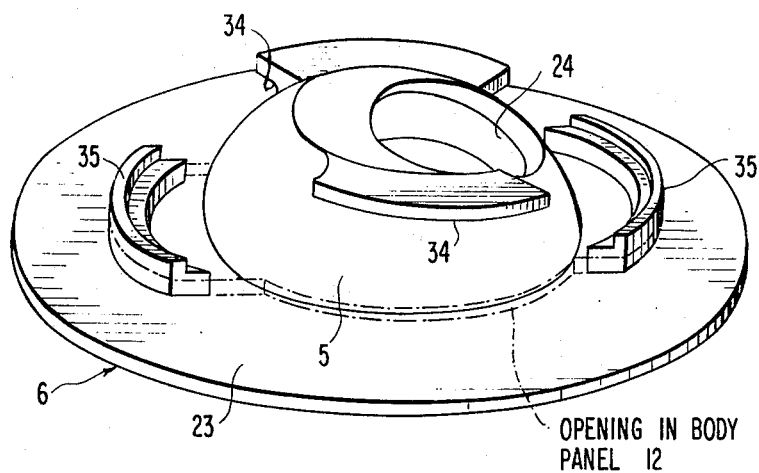
FIG. 9 is a perspective bottom view on the collar of the mounting support of FIGS. 1 - 4.

The two joints 4/5 and 10/11 are stressed and clamped together in unison by a single drawspring 20 extending through the hollow ball 5 in the direction of the joint normal 9; one lug or hook 21 of the spring 20 is suspended in the suspension opening 18 at the cross web 16 of the bead-like joint member 11. Since the hook 21 is arranged at right angle to the cross web 16 and since it must be capable of being pulled through the socket 10 during a pivoting of the joint 10/11, a cross slot 22 (FIG. 1) for the hook 21 is provided in the socket 10. The ball socket 5 is provided with an aperture 24 for the winding portion of the drawspring 20; however, the aperture 24 is intentionally arranged eccentrically to the center axis 9 of the joint socket 5 in order that the edge place 25 located nearest the axis 9 of the opening 24 is able to form an axial abutment for the first winding of the coil portion of the drawspring 20. A theft protection is created thereby since now the spring 20 can no longer be stretched at will and the joint 4/5 or 10/11 can now no longer be forcibly opened. The other end of the spring 20 which includes the lug or hook 26 is suspended by means of a pin 27 at a bracket-like hold-down member generally designated by reference numeral 28. The hold-down member 28 includes legs 29 which are curved in cross section in the shape of a circular arc so that the legs 29 are very rigid and stiff. The web-like bottom connection 31 of the legs 29 which receives the pin 27 is strongly embossed or grooved and is therefore very bending rigid and offers a bead-like or bulge-like opening 30 reinforced at the edge for the hook 26. The free ends of the legs 29 are flanged over and form two oppositely disposed support leg portions 32 curved in the shape of a circular arc as viewed in the axial direction 9. Two barb-like retaining projections or nose portions 33 are punched out of the material of the legs 29 within the area of the support foot portions 32. These barb-like retaining lugs or projections 33 engage in the manner of a bayonet connection in two mutually opposite securing grooves 34 (FIGS. 3 and 9) which are open in the radially outward and circumferential direction, extend over an angular space of about 45°, respectively, and are provided on the outside of the socket 5. By pivoting the hold-down member 28 through 90° from its position shown in FIG. 2, the retaining projections or nose portions 33 can therefore be moved relative to the grooves 34 and to the ball socket 5 and can therefore be engaged end-face into the grooves 34 along an arc (FIG. 3). As a result thereof, another theft protection complementing the already described theft protection is created. This is so as the collar 6 can now no longer be forcibly pulled off from the body 2— for example, by overstretching the spring 20. The collar 6 and with the same the entire mounting support is locked at the body by the retaining projections 33 and the securing grooves 34. Two spacers 35 which are in the shape of circular arcs as viewed in the axial direction 9 and which are arranged concentrically to the axis 9 circumferentially between the securing grooves 34 and mutually opposite are provided at the support flange 23 and form in effect extensions extending through the corresponding opening in the body panel 2, whereby the hold-down member 28 is supported with its support foot portions 32 on the spacers 35 in the pre-assembled condition illustrated in FIG. 2. The spacer portions 35 serve as anti-rotational securing means of the mounting support at the fastening place i.e., as means preventing rotation thereof, by reason of the their non-circular construction of the extensions thereof extending through the body. The spacer portions 35 are slightly longer than the thickness of the body panel 2 and are intended to hold the support foot portions 32 of the hold-down member 28 at a distance ready for assembly with respect to the support flange 23. By rotation of the hold-down member 28 through 90° about the axis 9, the hold-down member 28 slides with its foot portions 32 off the spacer portions 35 in the circumferential direction; the retaining projections 33 thereby enter into the securing grooves 34. In a predetermined rotational position, the support foot portions 32 jump off the spacer portions 35 and onto the circumferential portions of the edge of the body aperture 36 for the insertion of the collar 6 which circumferential portions extend between the spacer portions 35 (FIG. 3). As a result thereof, the hold-down member 28 clamps fast the collar 6 from below against the outer body panel 2 with the force of the tension spring 20. The tension spring 20 therefore assumes both functions of stressing and clamping together the joints as also of producing the hold-down forces for the collar 6—by way of the hold-down member 28—and therewith for the entire mounting support. Owing to this combination of functions, a construction results which is very favorable from a price point of view.

Figure 4:
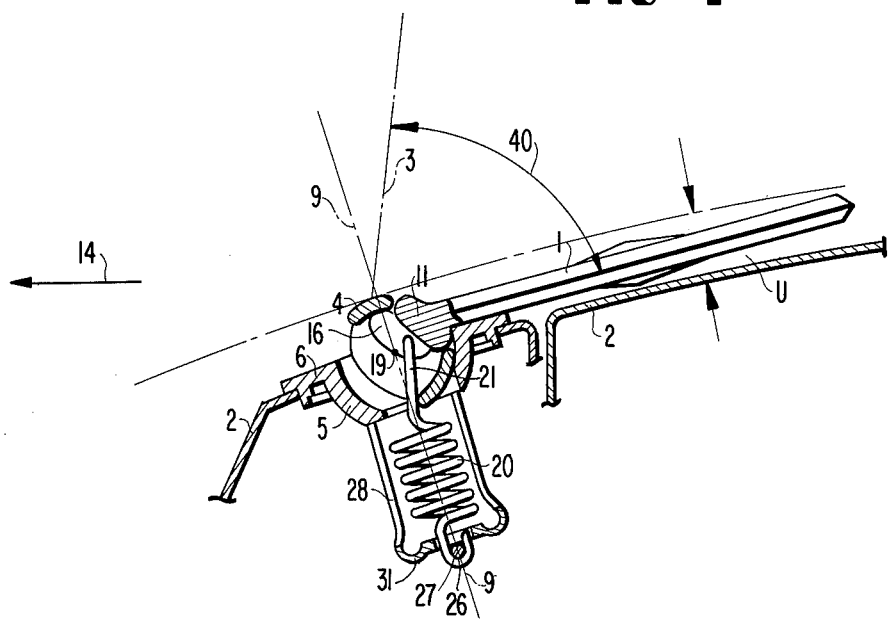
FIG. 4 is a cross-sectional view, similar to FIG. 2, and illustrating the position of the mounting support with the radiator emblem in the completely rearwardly tilted position.
Figure 5:
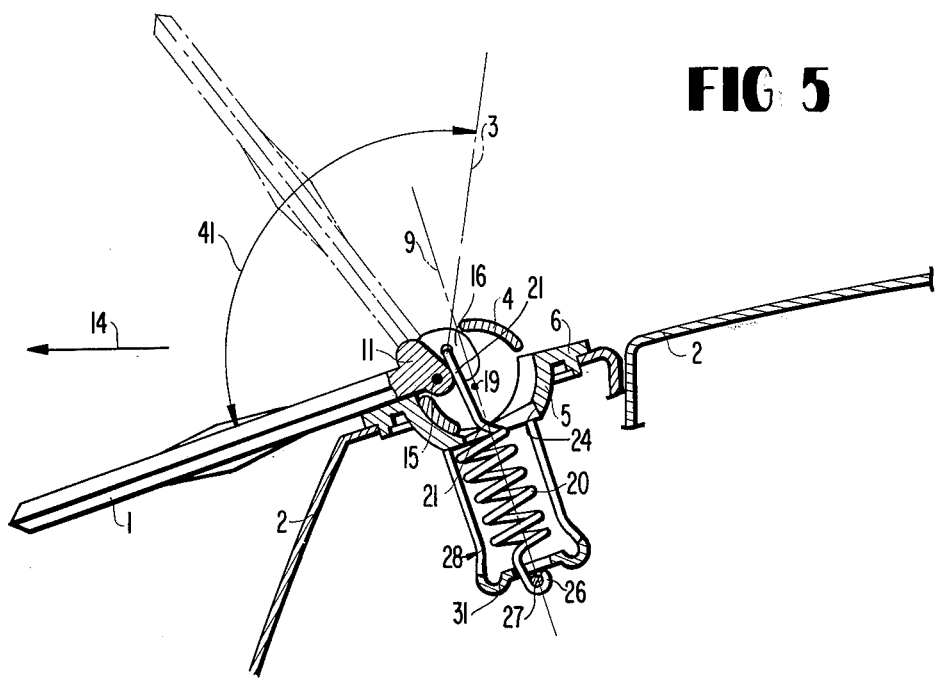
FIG. 5 is a cross-sectional view, similar to FIG. 4, and illustrating the position of the emblem in the fully forwardly tilted position.

In FIGS. 4 and 5, the movable mounting support is illustrated in two cross-sectional views corresponding to the cross section of FIG. 2. The normal position of the extension plane 3 of the emblem 1 is indicated by a dash and dotted line and is designated by reference numeral 3. FIG. 4 illustrates a position of the firm emblem 1 completely tilted down toward the rear. Since the body 2 extends rising toward the rear within the area of the fastening place and the normal position of the firm emblem 1 is slightly inclined toward the rear with respect to the vertical direction, the free angular space to the rear of the firm emblem 1 when in the normal position, which is designated by reference numeral 40, is considerably smaller than a right angle. This angle 40 can therefore be overcome alone by the triple joint connection 4/5. By reason of this possibility, the single joint connection 10/11 is blocked in the pivotal direction toward the rear by the corresponding configuration of the cross web 16; with an impact toward the rear, the retaining projections 7 which are adapted to be overcome by pressure are to be immediately forced out of the detent recesses 8 without first causing the joint 10/11 to respond. It also contributes to the movability up to the completely flat position of the emblem (FIG. 4) that the firm emblem is arranged eccentrically to the joint ball 4 by the distance E (FIG. 2) and that the bead-like joint member 11 is so shaped on its outside that it is able to immerse into the opening of the collar 6 which passes over into the ball socket 5. Owing to the large angular movability of the triple jointed connection 4/5 to the slight ball diameter and to the arrangement of the ball center 19 near the surface, it is achieved that the projecting length beyond the body 2 on the part of the firm emblem 1, when tilted down flat, i.e., the distance U (FIG. 4), is only very slight and the European safety regulations which permit therefor maximum a projection of 10 mm., can be maintained. The illustration of FIG. 4 shows the most frequent case, namely that the firm emblem 1 is tilted down opposite the driving direction 14. With an obliquely laterally impinging impact, the triple joint connection 4/5 will carry out a rotation about the upright axis 9 and then a pivot movement about a pivot axis disposed parallel to the plane 3 of the emblem 1 and of the body up to the flattened-off position.

The less frequently occurring case of an impact from the rear is illustrated in FIG. 5. The free angular space 41 disposed in front of the firm emblem 1 is considerably larger than a right angle and cannot be bridged over any longer by one joint alone. Consequently, both joints 10/11 and 4/5 must respond in this tilted-down position. Since the triple joint connection 4/5 is held in a normal position by a detent adapted to be overcome by pressure, at first only the joint 10/11 responds which is retained only elastically in its normal position—by reason of a flattened-off portion and the clamping action of spring 20—and which is not blocked in the tilting direction toward the front. As a result thereof, the drawspring 20 is increasingly tensioned and an eccentrically effective, increasing pressure or force is exerted on the ball 4. This eccentric pressure leads at some time during the forward tilting-down movement to the fact that the detent surfaces 8 of the ball 4 are overcome by pressure and the ball joint 4/5 moves along. The two joints can then together bridge the angular space 41. It may thereby happen that—after the detent surfaces 8 of the ball joint 4/5 are once overcome by pressure—the single pivot connection 10/11 which continues to be elastically stressed and clamped as before in the direction of the normal position thereof, at first again closes at the expense of a corresponding opening of the ball joint 4/5 and after the detent release or disengagement, at first the pivot path of the ball joint 4/5 is completely utilized with a forwardly directed tilting movement. This intermediate position is indicated in FIG. 5 in dash and dotted lines; the bead-like joint member 11 is thereby immersed into the aperture of the collar 6 up to the extension of the firm emblem. As a result thereof, an abutment limiting the pivot path of the ball joint 4/5 is produced. With a further pressure effective from the rear onto the firm emblem, the single pivotal connection 10/11 then becomes effective up to the completely flattened position illustrated in FIG. 5 in full lines.

The second embodiment illustrated in FIGS. 6 to 8 differs from the first embodiment essentially by the construction of the collar and the elastically yieldingly fastened ball socket. Insofar as identity exists, the same reference numerals are used for the same parts while for parts which have a correspondence, corresponding reference numerals of the 100 series are used so that in that respect reference may be had to the previous description. Hereinafter, only the differences will still be discussed.

The ball socket 105 of the triple joint connection 4/105 is yielding in case of an impact effective approximately perpendicularly to the body surface 2 and is constructed as separate part 105 with respect to the collar 106. The ball socket 105 is pressed into the normal position by a prestressed compression spring 50. Since detent recesses 8 are also provided in the ball socket 105 which in cooperation with corresponding retaining projections 7 provided at the joint ball 4 determine the normal position in the vertical and in the cross direction, the ball socket 105 must always assume a defined circumferential position relative to the collar 106. The ball socket 105 is, for that purpose, pivotally connected in a hinge-like manner at one of the two spacer portions 135a and 135b, namely, at the spacer 135b disposed to the rear of the firm emblem 1 as viewed in the driving direction. The axis of the hinge pin 51 is disposed parallel to the body outer panel 2 at the fastening place of the mounting support and parallel to the normal position of the firm emblem 1 (FIG. 6). The compression spring 50 is constructed so large in diameter that it is able to accommodate on the inside thereof the drawspring 20. The retaining bracket 52 supporting the spring 50 is also provided with an aperture for the spring 20 at its support place. The retaining bracket 52 is suspended with its legs which are curved in the shape of a circular arc in cross section, in retaining lugs 53 provided at the collar 106 by way of flanged-over hooks (FIG. 7). The retaining lugs or extensions 53 are provided for that purpose with suspension slots 54.

The support flange 123 of the collar 106 includes an axially extending extension of non-round outer contour (FIG. 8) which extends through the correspondingly formed opening in the body panel 2; nonetheless, the circumferential lines of the extension which includes the retaining lugs 53 and the spacer portions 135a and 135b is constructed in sections corresponding to the outer contours of the retaining lugs 53 and spacer portions 135a and 135b in the form of circular arcs with a common center 9. The extension thus includes circumferential places of different axial and different radial dimension. At two mutually opposite places, two spacer portions 135a and 135b which among one another extend axially equally far are provided which as regards their radial position correspond to the position and the configuration of the support foot portions 132 of the hold-down member 128. The hold-down member 128 is supported on the spacer portions 135a and 135b in the pre-assembled condition illustrated in FIG. 6. Detent places are arranged at the circumferential places located between the spacer places 135a and 135b. At these circumferential places, the extension is reduced to a smaller radial dimension to form the retaining lugs 53. The outer contour of the retaining lugs 53 corresponds to the inner contour of the hold-down member 128 which is able to slide off in the circumferential direction by way of the retaining lugs. In order to facilitate a circumferential sliding movement of the hold-down member 128 onto the retaining lugs 53, the side flanks 55 thereof are constructed radially inclined in the circumferential direction. The retaining lugs 53 serve for the hold-down member 128 simultaneously as guide means and as centering means during the rotation about the vertical axis 9 (assembly of the mounting support at the body). When the support foot portions 132 of the hold-down member 128 slide off the spacer places 135a and 135b during the rotation in the circumferential direction, they jump onto the edge of the sheet metal aperture in the body panel 2 and clamp the mounting support fast from the inside. A theft protection of the mounting support against a forcible lifting of the collar 106 from the body by over-stretching the spring 20 may be realized in the embodiment according to FIGS. 6 to 8 in that the retaining bracket 52 and the hold-down member 128 are provided with mutually interengaging recesses 252 and projecting retaining lugs 228 engaging with one another in the circumferential direction so that they are locked together in the manner of a bayonet-lock and are secured against a forcible pulling out as illustrated in FIGS. 10–13.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A mounting support for a flat structural part projecting from an outer body panel of a motor vehicle body, which comprises a first joint means including bearing socket means and a joint member, said joint member being pivotal in the bearing socket means about several pivot axes intersecting at least approximately in a common point forming the pivot center, characterized in that a second joint means enabling only essentially a single degree of freedom of movement and forming a single pivotal connection is provided between the joint member of the first joint means and the structural part, the pivot axis of the second joint means being arranged approximately transversely to the driving direction and at least approximately parallel to the outer body panel.

2. A mounting support according to claim 1, characterized in that the pivot center of the first joint means forming a triple joint connection and including the bearing socket means and joint member is located at least approximately within the course of the outer body panel, and in that about half of the diameter of the kinematicaly effective surface of the joint member of said first joint means corresponds at most approximately to the thickness of the structural part.

3. A mounting support according to claim 2, characterized in that the bearing socket means of the first joint means is open in the direction toward the structural part, the joint member of the first joint means being urged into the bearing socket means by spring force.

4. A mounting support according to claim 3, characterized in that the joint member of the first joint means is a joint ball.

5. A mounting support according to claim 3, characterized in that the joint member of the first joint means is stabilized in a normal position by detent means.

6. A mounting support according to claim 5, characterized in that the detent means includes nose-like detent projections.

7. A mounting support according to claim 1, characterized in that the pivot center of the first joint means is arranged offset toward one direction with respect to the plane of the retained structural part.

8. A mounting support according to claim 7, characterized in that the pivot center of the first joint means is offset toward the rear in the driving direction.

9. A mounting support according to claim 1, characterized in that the second joint means is constructed as elastically clamped together socket joint.

10. A mounting support according to claim 1, characterized in that the second joint means includes a joint member and a joint socket, the joint member of the second joint means being held with its outer contour opposite the joint socket thereof at least approximately inside the kinematically effective surface of the first joint means as imaginary envelope.

11. A mounting support according to claim 10, characterized in that the joint socket and joint member of the second joint means have flattened off portions, the second joint means exhibiting a return moment into a normal position determined by the relative position of the flattened off portion by reason of the elastic clamping action clamping together the joint means and of a corresponding construction of the flattened off portions.

12. A mounting support according to claim 11, characterized in that the imaginary line characterizing the normal position of the first joint means which forms a joint normal is inclined relative to the plane of the structural part.

13. A mounting support according to claim 12, characterized in that said line is inclined forwardly as viewed in the driving direction.

14. A mounting support according to claim 13, characterized in that said imaginary line of the second joint means, which forms the joint normal, is also arranged inclined with respect to the corresponding joint normal of the first joint means which determines the position thereof by detent means adapted to be overcome by pressure.

15. A mounting support according to claim 14, characterized in that the joint normal of the second joint means is inclined forwardly as viewed in the driving direction, with respect to the joint normal of the first joint means.

16. A mounting support according to claim 10, characterized in that a cross web extending substantially perpendicularly to the pivot axis is provided at the joint member of the second joint means and a corresponding cross slot is provided in the joint socket thereof, and in that a spring means engages at the cross web which effects the elastic clamping action for the joint means.

17. A mounting support according to claim 16, characterized in that said spring means is a coil spring.

18. A mounting support according to claim 16, characterized in that the spring means elastically clamping together the second joint means and the spring means clamping together the first joint means is the same spring.

19. A mounting support according to claim 11, characterized in that the joint socket and joint member of the second joint means are constructed essentially round—as viewed on the flattened off portions—and the transition from the flattened off portions into the remaining socket surface is rounded off in cross section, whereby the centers of the rounded off portions at two diametrally opposite places effectively constitute the instantaneous pivot axes of the second joint means.

20. A mounting support according to claim 16, characterized in that at least one flank of the cross web is constructed with its contour at most approximately on a relatively large circular arc slidable through the associated cross slot with the center lying in the instantaneous pivot axis of the second joint means.

21. A mounting support according to claim 20, characterized in that said at least one flank is the rear flank of said cross web.

22. A mounting support according to claim 20, characterized in that said cross web is constructed with its contour inside said circular arc.

23. A mounting support according to claim 22, characterized in that the other flank of said cross web is constructed—starting from the normal position of the second joint means—at least approximately following the inner contour of a cavity of the joint member of the first joint means.

24. A mounting support according to claim 23, characterized in that said last-mentioned flank is the front flank of the cross web.

25. A mounting support according to claim 16, characterized in that one flank of said cross web is constructed—starting from the normal position of the second joint means—at least approximately following the inner contour of a cavity of the joint member of the first joint means.

26. A mounting support according to claim 25, characterized in that said last-mentioned flank is the front flank of the cross web.

27. A mounting support according to claim 1, characterized in that the socket means of the first joint means is yieldingly supported substantially perpendicularly to the outer body panel but is pivotally connected at a relatively fixed body part secured against rotation and is assisted by a coil spring.

28. A mounting support according to claim 27, characterized in that said joint socket means is pivotally connected at said fixed body part in a hinge-like manner.

29. A mounting support according to claim 1, characterized in that a collar means which includes a support flange is provided which is inserted into an opening of the outer body panel, covers off the opening externally by means of the support flange and at least indirectly carries the first joint means, and in that a hold-down means is provided which is supported within the area of the support flange of the collar means against the inside of the body outer panel.

30. A mounting support according to claim 29, characterized in that a spring means elastically clamping together the first joint means is constructed as drawspring and is suspended with its hook opposite the first joint means at a point of the hold-down means.

31. A mounting support according to claim 30, characterized in that the hook of said drawspring is suspended from a pin held against the outside of the bottom portion of said hold-down means.

32. A mounting support according to claim 29, characterized in that the insert opening for the collar means in the body panel as well as an extension at the collar means extending through the insert opening and correspondingly formed are constructed non-round, in that the hold-down means is rotatably arranged with respect to the collar means and is supported exclusively in individual circumferential support places of the opening edge owing to a recess means.

33. A mounting support according to claim 32, characterized in that spacer means are provided at the extension of the collar means in circumferential places with such a radial dimension of the extension, which are at least substantially equal to the corresponding distances and corresponding radial position of the support places of the hold-down means, and in that detent means are provided at the extension of the collar means adjacent to the spacer means in the circumferential direction with such a radial dimension of the extension which are smaller than the corresponding distances and the corresponding radial position of the support places of the hold-down means.

34. A mounting support according to claim 33, characterized in that the radial dimension of the extension is larger than the corresponding distances and the corresponding radial position of the support places for the hold-down means.

35. A mounting support according to claim 33, characterized in that the axial projection of the extension of the collar means axially extending beyond the effective surface of the support flange is approximately of the same size within the area of the spacer places and is constructed corresponding at least approximately to the material thickness of the outer body panel plus the thickness of any washer.

36. A mounting support according to claim 34, characterized in that the axial projection of the extension of the collar means projecting beyond the effective surface of the support flange is larger within the area of the detent places than within the area of the spacer places.

37. A mounting support according to claim 36, characterized in that the individual circumferential areas of the extension of the collar means are shaped in the form of a circular arc with a radius of curvature located approximately in the center point of the collar means.

38. A mounting support according to claim 37, characterized in that the circumferential areas of the detent places which axially project with respect to the spacer places of the extension of the collar means are provided at the circumferential transition places with radially outwardly pointing bevelled off portions.

39. A mounting support according to claim 1, characterized in that the socket means of the first joint means is provided with an aperture for the passage of a coil spring elastically clamping together the joint means and in that the aperture is arranged eccentrically to the coil spring.

40. A mounting support according to claim 1, characterized in that the hold-down means in the installed position is at least indirectly form-lockingly locked together with the collar means.

41. A mounting support according to claim 40, characterized in that the hold-down means is locked with the collar means by a bayonet-like locking means.

42. A mounting support according to claim 5, characterized in that the pivot center of the first joint means is arranged offset toward one direction with respect to the plane of the retained structural part.

43. A mounting support according to claim 42, characterized in that the pivot center of the first joint means is offset toward the rear in the driving direction.

44. A mounting support according to claim 5, characterized in that the second joint means includes a joint member and a joint socket, the joint member of the second joint means being held with its outer contour opposite the joint socket thereof at least approximately inside the kinematically effective surface of the first joint means as imaginary envelope.

45. A mounting support according to claim 44, characterized in that the joint socket and joint member of the second joint means have flattened off portions, the second joint means exhibiting a return moment into a normal position determined by the relative position of the flattened off portion by reason of the elastic clamping action clamping together the joint means and of a corresponding construction of the flattened off portions.

46. A mounting support according to claim 43, characterized in that the imaginary line characterizing the normal position of the first joint means which forms a joint normal is inclined relative to the plane of the structural part.

47. A mounting support according to claim 46, characterized in that said line is inclined forwardly as viewed in the driving direction.

48. A mounting support according to claim 47, characterized in that said imaginary line of the second joint means, which forms the joint normal, is also arranged inclined with respect to the corresponding joint normal of the first joint means which determines the position thereof by detent means adapted to be overcome by pressure.

49. A mounting support according to claim 48, characterized in that the joint normal of the second joint means is inclined forwardly as viewed in the driving direction, with respect to the joint normal of the first joint means.

50. A mounting support according to claim 49, characterized in that the pivot center of the first joint means is arranged offset toward one direction with respect to the plane of the retained structural part.

51. A mounting support according to claim 50, characterized in that the pivot center of the first joint means is offset toward the rear in the driving direction.

52. A mounting support according to claim 49, characterized in that a cross web extending substantially perpendicularly to the pivot axis is provided at the joint member of the second joint means and a corresponding cross slot is provided in the joint socket thereof, and in that a spring means engages at the cross web which effects the elastic clamping action for the joint means.

53. A mounting support according to claim 52, characterized in that the spring means elastically clamping together the second joint means and the spring means clamping together the first joint means is the same spring and in that the joint member of the first joint means is constructed hollow and the point of pivotal connection of the spring is arranged on the inside of the hollow joint member of the first joint means.

54. A mounting support according to claim 52, characterized in that the joint socket and joint member of the second joint means are constructed essentially round—as viewed on the flattened off portions— and the transition from the flattened off portions into the remaining socket surface is rounded off in cross section, whereby the centers of the rounded off portions at two diametrally opposite places effectively constitute the instantaneous pivot axes of the second joint means.

55. A mounting support according to claim 54, characterized in that at least one flank of the cross web is constructed with its contour at most approximately on a relatively large circular arc slidable through the associated cross slot with the center lying in the instantaneous pivot axis of the second joint means.

56. A mounting support according to claim 55, characterized in that said at least one flank is the rear flank of said cross web.

57. A mounting support according to claim 56, characterized in that the other flank of said cross web is constructed—starting from the normal position of the second joint means—at least approximately following the inner contour of a cavity of the joint member of the first joint means.

58. A mounting support according to claim 57, characterized in that the socket means of the first joint means is yieldingly supported substantially perpendicularly to the outer body panel but is pivotally connected at a relatively fixed body part secured against rotation and is assisted by a coil spring.

59. A mounting support according to claim 49, characterized in that a collar means which includes a support flange is provided which is inserted into an opening of the outer body panel, covers off the opening externally by means of the support flange and at least indirectly carries the first joint means, and in that a hold-down means is provided which is supported within the area of the support flange of the collar means against the inside of the body outer panel.

60. A mounting support according to claim 59, characterized in that the spring means elastically clamping together the first joint means is constructed as draw-spring and is suspended with its hook opposite the first joint means at a point of the hold-down means.

61. A mounting support according to claim 60, characterized in that the insert opening for the collar means in the body panel as well as an extension at the collar means extending through the insert opening and correspondingly formed are constructed non-round, in that the hold-down means is rotatably arranged with respect to the collar means and is supported exclusively in individual circumferential support places of the opening edge owing to a recess means.

62. A mounting support according to claim 61, characterized in that spacer means are provided at the extension of the collar means in circumferential places with such a radial dimension of the extension, which are at least substantially equal to the corresponding distances and corresponding radial position of the support places of the hold-down means, and in that detent means are provided at the extension of the collar means adjacent to the spacer means in the circumferential direction with such a radial dimension of the extension which are smaller than the correspoming distances and the corresponding radial position of the support places of the hold-down means.

63. A mounting support according to claim 62, characterized in that the axial projection of the extension of the colar means axially extending beyond the effective surface of the support flange is approximately of the same size within the area of the spacer places and is constructed corresponding at least approximately to the material thickness of the outer body panel plus the thickness of any washer.

64. A mounting support according to claim 62, characterized in that the axial projection of the extension of the collar means projecting beyond the effective surface of the support flange is larger within the area of the detent places than within the area of the spacer places.

65. A mounting support according to claim 62, characterized in that the individual circumferential areas of the extension of the collar means are shaped in the form of a circular arc with a radius of curvature located approximately in the center point of the collar means.

66. A mounting support according to claim 62, characterized in that the circumferential areas of the detent places which axially project with respect to the spacer places of the extension of the collar means are provided at the circumferential transition places with radially outwardly pointing bevelled off portions.

67. A mounting support according to claim 44, characterized in that the socket means of the first joint means is provided with an aperture for the passage of a coil spring elastically clamping together the joint means and in that the aperture is arranged eccentrically to the coil spring.

68. A mounting support according to claim 44, characterized in that the hold-down means in the installed position is at least indirectly form-lockingly locked together with the collar means.

69. A mounting support according to claim 68, characterized in that the hold-down means is locked with the collar means by a bayonet-like locking means.

* * * * *